(12) United States Patent
Choi et al.

(10) Patent No.: US 7,746,025 B2
(45) Date of Patent: Jun. 29, 2010

(54) VARIABLE SPEED MOTOR

(75) Inventors: Byung Keol Choi, Inchun-si (KR); Dong Soo Lee, Seoul (KR); Byoung Wook Min, Seoul (KR); Dong Won Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1248 days.

(21) Appl. No.: 11/287,207

(22) Filed: Nov. 28, 2005

(65) Prior Publication Data

US 2006/0181238 A1    Aug. 17, 2006

(30) Foreign Application Priority Data

| Feb. 14, 2005 | (KR) | ...................... 10-2005-0011858 |
| Feb. 14, 2005 | (KR) | ...................... 10-2005-0011859 |
| Feb. 14, 2005 | (KR) | ...................... 10-2005-0011860 |
| Feb. 14, 2005 | (KR) | ...................... 10-2005-0011861 |

(51) Int. Cl.
*H02P 1/48* (2006.01)

(52) U.S. Cl. .................. 318/772; 318/768; 318/773

(58) Field of Classification Search .............. 318/751, 318/752, 768, 772, 773, 778, 779
See application file for complete search history.

(56) References Cited

U.S. PATENT DOCUMENTS

| 2,774,924 | A | * | 12/1956 | Witt ............................ 318/774 |
| 4,384,312 | A | * | 5/1983 | Fry ............................. 361/24 |
| 4,467,257 | A | * | 8/1984 | Douthart et al. ............. 318/774 |
| 5,146,146 | A | * | 9/1992 | Samann ...................... 318/768 |
| 5,212,436 | A | | 5/1993 | Nacewicz et al. |
| 5,227,710 | A | | 7/1993 | Lewus ......................... 318/781 |
| 5,300,871 | A | | 4/1994 | Bucher et al. |
| 5,514,943 | A | * | 5/1996 | Shapess ...................... 318/772 |
| 5,703,458 | A | | 12/1997 | Gershen et al. |
| 5,883,488 | A | * | 3/1999 | Woodward ................... 318/786 |
| 6,175,208 | B1 | | 1/2001 | Rose |
| 6,175,209 | B1 | | 1/2001 | Fei |
| 6,445,101 | B2 | * | 9/2002 | Ley ............................ 310/184 |
| 6,707,214 | B1 | * | 3/2004 | Fei ............................. 310/184 |
| 6,815,926 | B2 | * | 11/2004 | Fei et al. ..................... 318/773 |
| 7,196,490 | B2 | * | 3/2007 | Kim et al. ................... 318/751 |

FOREIGN PATENT DOCUMENTS

| DE | 1802917 A1 | 6/1970 |
| DE | 1638385 A1 | 7/1971 |
| EP | 0545087 A1 | 6/1993 |
| FR | 1556314 A | 2/1969 |
| JP | 03-150058 A | 6/1991 |
| JP | 03-235696 A | 10/1991 |
| JP | 08-251985 A | 9/1996 |
| JP | 08-317691 A | 11/1996 |

* cited by examiner

*Primary Examiner*—Walter Benson
*Assistant Examiner*—Eduardo Colon-Santana
(74) *Attorney, Agent, or Firm*—Birch, Stewart, Kolasch & Birch, LLP (57) ABSTRACT

A variable speed motor includes a main winding including first and second main windings, and an auxiliary winding including first and second auxiliary windings, wherein the main winding and the auxiliary winding are wound on a stator to form a plurality of poles, and a plurality of relays for performing a switching operation between serial/parallel connections of the first and second main windings or the first and second auxiliary windings. The variable speed motor includes a stator on which a 4-pole winding and a 12-pole winding are wound, a plurality of tap windings connected in series to a 4-pole main winding forming 4 poles, for extending a variable range of rotation speed of the motor during a 4-pole operation mode, and a phase control circuit for varying rotation speed of the motor by controlling a phase of an input power-supply signal during a 12-pole operation mode.

11 Claims, 11 Drawing Sheets

VARIABLE SPEED MOTOR

BACKGROUND OF THE INVENTION

1. Field of the Invention

The present invention relates to a variable speed motor, and more particularly to a variable speed motor for allowing a relay to perform a switching operation between serial/parallel connections of at least one winding composed of a main winding and an auxiliary winding, connecting a tap winding to a 4-pole main winding to perform a switching of the tap winding, such that it can greatly increase a variable range of a rotation speed of the motor.

2. Description of the Related Art

Figure 1:
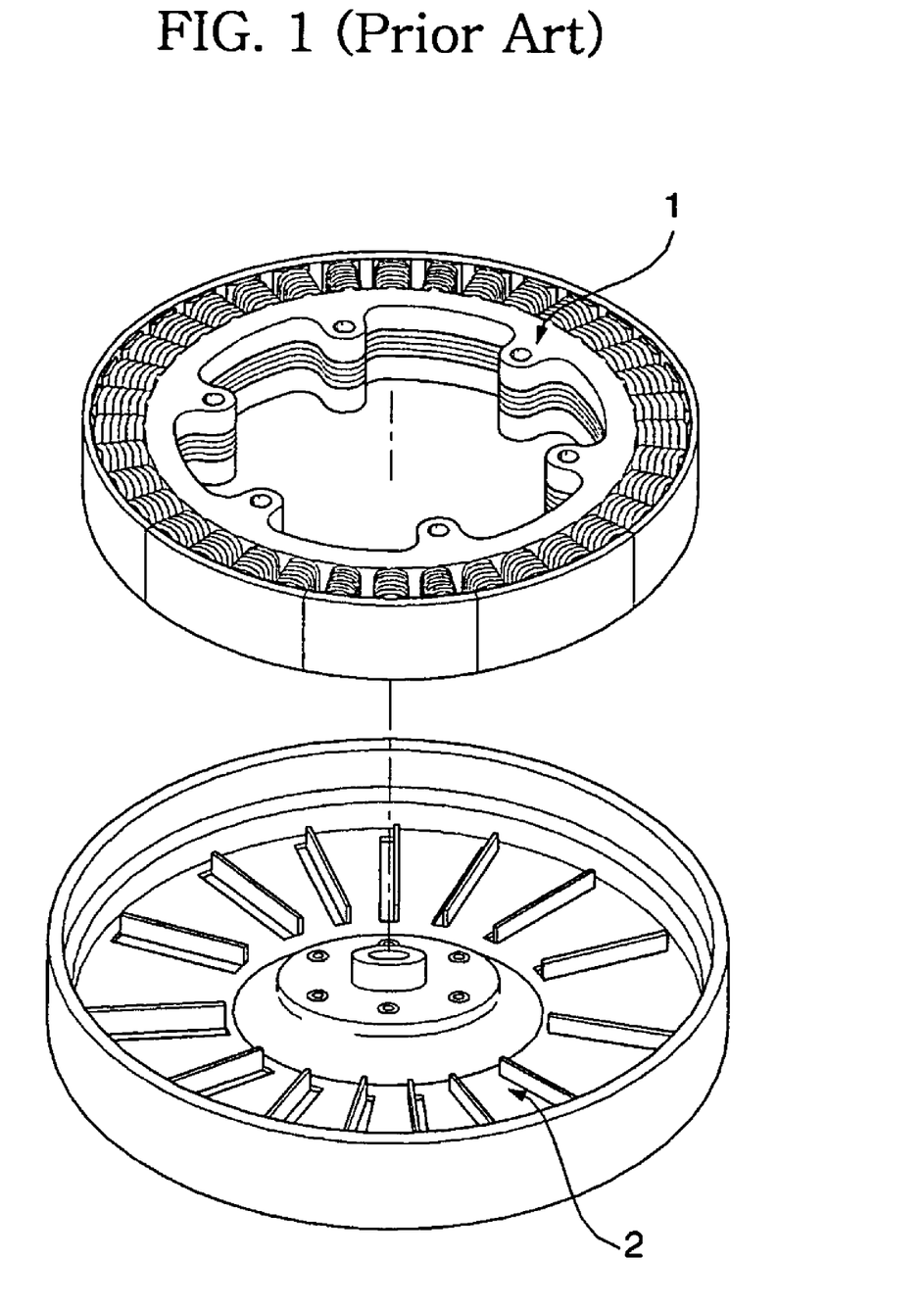
FIG. 1 is an exploded perspective view of a conventional outer-rotation motor.
Figure 2:
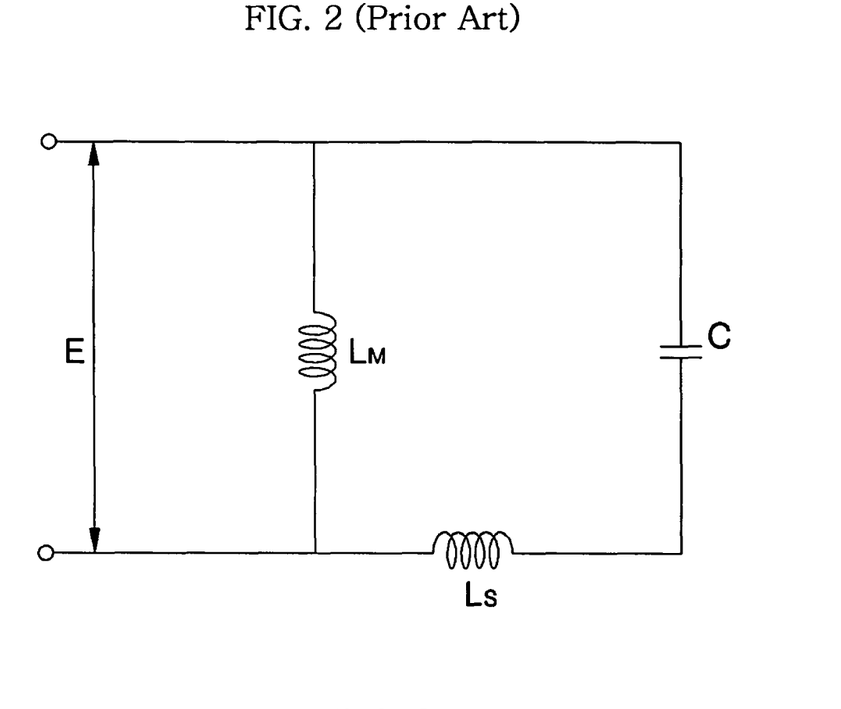
FIG. 2 is a circuit diagram of a conventional capacitor-type outer-rotation motor.

FIG. 1 is an exploded perspective view of a rotor and a stator contained in a conventional outer-rotation motor. FIG. 2 is a circuit diagram of a conventional capacitor-type single-phase induction motor.

Typically, a motor includes a stator to which windings are mounted, and a rotator to which a permanent magnet is mounted. The motor generates periodic current variation in the winding mounted to the stator, torque occurs in the rotor by a constant variation of a magnetic field depending on current variation, such that the motor can acquire rotation power by the torque.

The motor is classified into an inner-rotation motor and an outer-rotation motor according to positions of the stator and the rotor. Particularly, the outer-rotation motor installs the stator 1 into the rotor 2, such that the rotor 2 is rotated by variation in current flowing in the winding of the stator 1, as shown in FIG. 1.

However, a general single-phase induction motor generates an alternating magnetic field caused by a main winding, differently from a three-phase induction motor capable of naturally generating a rotating magnetic field, such that it does not generate rotation force, and a single-phase motor in a stationary state is not rotated alone.

Therefore, the induction motor includes not only a main winding but also an auxiliary winding capable of generating a starting torque, and includes a starting device for initially starting the above-mentioned induction motor. The induction motor is classified into a split-phase start motor, shaded-coil type motor, a capacitor-operation motor, and a repulsion start motor according to categories of the starting device.

For example, the widely used capacitor motor will hereinafter be described with reference to FIG. 2.

FIG. 2 is an equivalent circuit of a conventional capacitor-type single-phase induction motor. Referring to FIG. 2, the capacitor-type single-phase induction motor includes a main winding $L_M$, an auxiliary winding $L_S$, and a capacitor C connected to the auxiliary winding $L_S$ in series. If a single-phase AC power signal E is applied to the capacitor-type single-phase induction motor, an alternating magnetic field is generated in the main winding $L_M$. In this case, the capacitor C controls a phase of a current signal flowing in the auxiliary winding $L_S$ to be preceded by a predetermined angle of 90°, such that an auxiliary magnetic field having a phase difference of 90° compared with the alternating magnetic field of the main winding $L_M$ is generated in the auxiliary winding $L_S$.

Therefore, the alternating magnetic field generated from the main winding $L_M$ and the auxiliary magnetic field generated from the auxiliary winding $L_S$ have different magnetic field phases, such that they are not compensated, but are summed. As a result, a rotating magnetic field is generated, such that the single-phase induction motor is rotated.

Although the single-phase induction motor is less effective than the three-phase induction motor in terms of performance and cost, its use is easier than that of the three-phase induction motor, so that it is widely used for household appliances requiring mainly low power consumption.

In the meantime, the single-phase induction motor including the starting device may require high-speed rotation or low-speed rotation due to unique operation characteristics of a specific device to which the motor is mounted.

In this case, if the motor is rotated upon receiving a single-phase AC (Alternating Current) voltage signal, a current variation of the received AC voltage signal is constantly maintained, resulting in limitation in changing speed of the motor. As a result, an additional device for varying the speed of the motor is required, such that other devices (for example, a three-phase motor, an inverter circuit, and a starting drive circuit) are also required.

If the motor includes the above-mentioned additional devices, additional production costs associated with the additional devices inevitably occur. In order to solve the above-mentioned problems, there has been newly proposed an improved method for including not only the coil wound on the stator but also an additional tap winding, resulting in variation of the motor speed.

If a user or operator desires to vary the motor speed using the tap winding, there is a limitation in varying the motor speed because a minimum variable speed of the motor corresponds to about a predetermined value of ⅔ of a synchronous speed of the motor, such that it is very difficult to extend the range of the variable speed of the motor.

SUMMARY OF THE INVENTION

Therefore, the present invention has been made in view of the above problems, and it is an object of the present invention to provide a variable speed motor for connecting a main winding and an auxiliary winding in parallel during high-speed rotation, and connecting the main winding and the auxiliary winding in series during low-speed rotation, such that it greatly extends the range of a variable speed of the motor.

It is another object of the present invention to provide a variable speed motor including a 4-pole winding and a 12-pole winding, performing a pole-change operation between the 4-pole winding and the 12-pole winding according to operation modes, connecting a tap winding to a 4-pole winding, such that it can greatly extend the range of a variable rotation speed of the motor.

In accordance with one aspect of the present invention, the above and other objects can be accomplished by the provision of a variable speed motor comprising: a main winding including first and second main windings, and an auxiliary winding including first and second auxiliary windings, wherein the main winding and the auxiliary winding are wound on a stator to form a plurality of poles; and a plurality of relays for performing a switching operation between serial/parallel connections of the first and second main windings or the first and second auxiliary windings, and extending a range of rotation speed of the motor.

In accordance with another aspect of the present invention, there is provided a variable speed motor comprising: a main winding including first and second main windings, and an auxiliary winding including first and second auxiliary windings, wherein the main winding and the auxiliary winding are wound on a stator to form a plurality of poles; a plurality of relays for performing a switching operation between serial/parallel connections of the first and second main windings or the first and second auxiliary windings; and a plurality of capacitors connected in series to the second auxiliary winding, for varying rotation speed of the motor in multiple stages.

In accordance with yet another aspect of the present invention, there is provided a variable speed motor comprising: a stator on which a 4-pole winding and a 12-pole winding are wound; a plurality of tap windings connected in series to a 4-pole main winding forming 4 poles, for extending a variable range of rotation speed of the motor during a 4-pole operation mode; and a phase control circuit for varying rotation speed of the motor by controlling a phase of an input power-supply signal during a 12-pole operation mode.

In accordance with yet another aspect of the present invention, there is provided a variable speed motor comprising: a main winding and an auxiliary winding which are mounted to a stator to form a plurality of poles; and a plurality of tap windings which are connected to the main winding and the auxiliary winding via relays to form serial/parallel connections, and extend a range of a variable speed.

The variable speed motor performs a switching operation between serial/parallel connections of main and auxiliary windings capable of forming poles, includes a plurality of capacitors connected to the auxiliary winding, greatly extends the range of a variable speed of the motor by controlling capacitances of the capacitors or an input voltage, and varies motor speed in multiple stages within the variable speed range.

The variable speed motor does not require an additional drive unit for varying the motor speed, such that production costs are greatly reduced, and electromagnetic vibration noise caused by a low-speed control mode of the motor is also greatly reduced.

The variable speed motor performs a pole-change operation according to operation modes, and extends the variable speed range of the motor while being operated as a specific pole-number motor. The variable speed motor further includes tap windings, which are connected in series to the main winding, or are additionally connected to each of the main winding and the auxiliary winding to extend the variable speed range of the motor.

Therefore, the variable speed motor can greatly extend the variable speed range of the motor without using an additional drive unit capable of varying the motor speed, and controls a medium or intermediate speed using a phase control operation, such that electromagnetic vibration noise caused by a low-speed dehydration process is greatly reduced.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

A preferred embodiment of the variable speed motor according to the present invention will hereinafter be described with reference to the annexed drawings.

A variable speed motor according to the present invention is a single-phase induction motor to which a single-phase AC power signal is applied. In the case of an outer-rotation motor in which a rotor is mounted to the outside of a stator, a rotation radius of the outer-rotation motor is greater than that of an inner-rotation motor, and torque per unit volume is greatly increased, such that the range of a low or high rotation speed of the motor can be extended according to serial/parallel winding connection states of coils.

Figure 3:
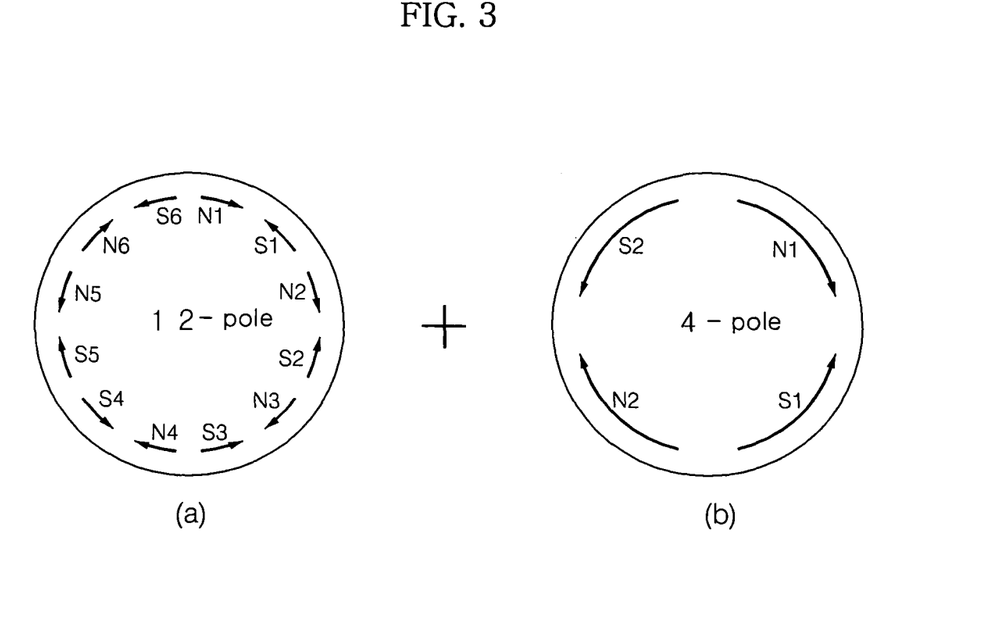
FIG. 3 is a wiring diagram of a pole-change single-phase winding of a variable speed motor according to the present invention.

FIG. 3 is a wiring diagram of a pole-change single-phase winding of a variable speed motor according to the present invention.

The variable speed motor according to the present invention acts as a pole-change motor on which at least one pole winding is wound, and performs a pole-change operation, such that it can adjust speed of the motor. For example, a switching operation between a 4-pole connection and a 12-pole connection of a stator is performed according to operation modes, and a switching operation between a 4-pole operation having a high RPM (Revolution Per Minute) and a 12-pole operation having a low RPM is performed in such a way that the motor is driven.

Figure 4A:
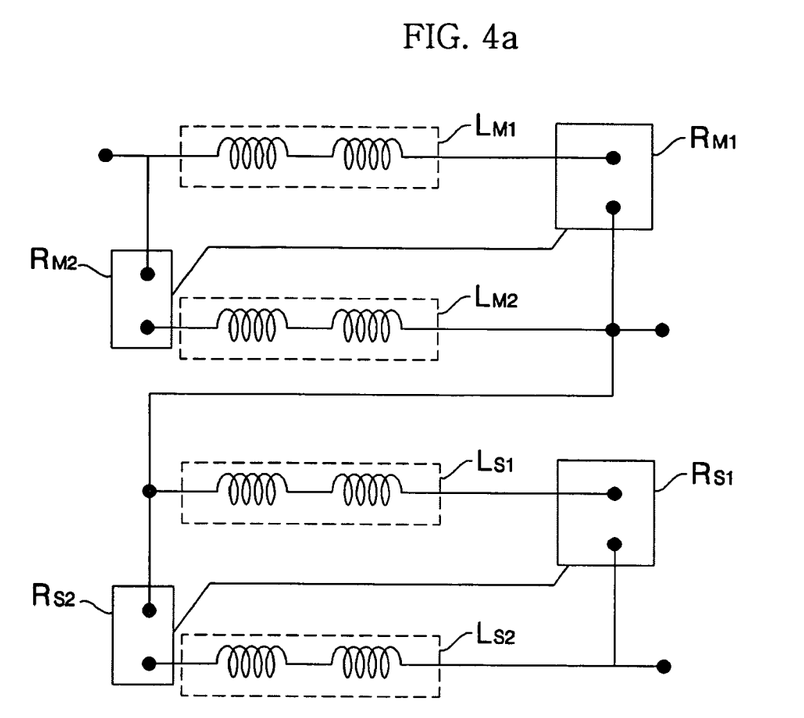
FIGS. 4a, 4b, and 4c are circuit diagrams illustrating connection between a main winding and an auxiliary winding for use in a variable speed motor in accordance with a first preferred embodiment of the present invention.
Figure 4B:
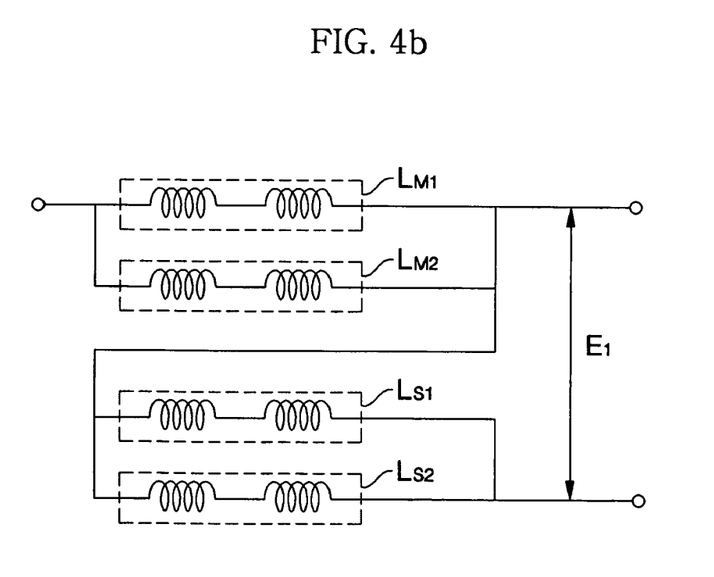
Figure 4C:
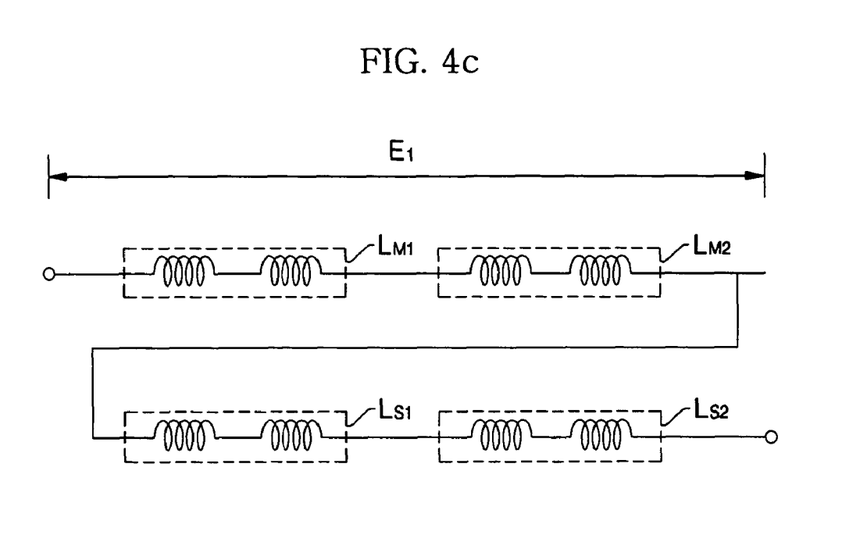

FIGS. 4a, 4b, and 4c are circuit diagrams illustrating connection between a main winding and an auxiliary winding for use in a variable speed motor in accordance with a first preferred embodiment of the present invention. FIG. 4a is a circuit diagram illustrating a connection between the main winding and the auxiliary winding in accordance with the first preferred embodiment of the present invention. FIG. 4b is a circuit diagram illustrating a serial connection between the main winding and the auxiliary winding in accordance with the first preferred embodiment of the present invention. FIG. 4c is a circuit diagram illustrating a parallel connection between first and second main windings and a serial connection among the first and second main windings and the auxiliary winding in accordance with the first preferred embodiment of the present invention.

Firstly, a main winding wound on a stator 1 in the variable speed motor according to the present invention includes first and second main windings, the first main winding forms a pole in the stator 1, the second main winding forms another pole in the stator 1, and the direction of a coil of the first main winding is opposite to that of the second main winding. Therefore, if a single-phase AC power signal is applied to the variable speed moor, the direction of a current signal capable of forming an adjacent pole is inverted, and a polarity of a magnetic field generated by the inverted current signal allows an N-pole and an S-pole to be alternately generated.

The motor further includes the main winding $L_M$ and an auxiliary winding $L_S$ in the stator to generate rotation torque.

The motor generates an alternating magnetic field in the main winding $L_M$ upon receiving a single-phase AC power signal, and is not rotated by the occurrence of the alternating magnetic field. Therefore, the motor forms an auxiliary magnetic field having an electrical phase difference of 90° compared with the alternating magnetic field of the main winding $L_M$ according to operations of a capacitor connected to the auxiliary winding $L_S$.

Therefore, the alternating magnetic field generated from the main winding $L_M$ and the auxiliary magnetic field generated from the auxiliary winding $L_S$ are not compensated by the phase difference of 90°, and a rotating magnetic field occurs by the phase difference of 90°, such that the induction motor can be rotated.

The variable speed motor according to the present invention includes first and second main windings $L_{M1}$ and $L_{M2}$ for forming the main winding $L_M$ and first and second auxiliary windings $L_{S1}$ and $L_{S2}$ for forming the auxiliary winding $L_S$.

As shown in FIG. 4a, the first and second main windings $L_{M1}$ and $L_{M2}$ include one or more relays $R_{M1}$ and $R_{M2}$, and the first and second auxiliary windings $L_{S1}$ and $L_{S2}$ include one or more relays $R_{S1}$ and $R_{S2}$. An overall main winding $L_M$ and an overall auxiliary winding $L_S$ may be connected in parallel or in series via the above-mentioned relays $R_{M1}$, $R_{M2}$, $R_{S1}$ and $R_{S2}$.

In this case, the relays $R_{M1}$, $R_{M2}$, $R_{S1}$, and $R_{S2}$ are selectively connected to terminals of individual circuits connected to the relays $R_{M1}$, $R_{M2}$, $R_{S1}$, and $R_{S2}$ according to a control signal generated from an external part, such that a switching operation between serial/parallel connections of the main winding $L_M$ and the auxiliary winding LS is performed.

Therefore, as shown in FIG. 4c, the first and second main windings $L_{M1}$ and $L_{M2}$ are connected in parallel to the first and second auxiliary windings $L_{S1}$ and $L_{S2}$ via the above-mentioned relays. If a single-phase AC voltage signal applied to the stator is 220V, a voltage loaded between the first and second main windings ($L_{M1}$, $L_{M2}$) and the first and second auxiliary windings ($L_{S1}$, $L_{S2}$) is 220V, and a magnetic field corresponding to the voltage of 220V is formed, such that the motor is rotated.

As shown in FIG. 4b, if the first and second main windings $L_{M1}$ and $L_{M2}$ are connected in series, a voltage of 220V is applied to the first and second main windings $L_{M1}$ and $L_{M2}$, a voltage of each main winding is 110V, such that rotation speed of the motor is changed according to the voltage of 110V.

The above-mentioned example will hereinafter be described in detail for the convenience of description and better understanding of the present invention.

If an AC voltage signal is applied to the above-mentioned circuit, and the relay performs serial/parallel connections of the main winding and the auxiliary winding, the motor satisfies the following equation 1:

$$V = 4.44 * f * \Phi * N \qquad \text{[Equation 1]}$$

Where, V is the magnitude of a voltage signal applied to both ends of a stator winding of the motor, f is a frequency of a power-supply signal applied to the motor, $\Phi$ is a magnetic flux generated in the motor, and N is the number of turns of the winding wound on the stator.

In other words, the magnetic flux generated in the motor is indicative of a voltage applied to both ends of each coil wound on the stator 1 of the motor. Therefore, if the first and second main/auxiliary windings $L_{M1}$, $L_{M2}$, $L_{S1}$, and $L_{S2}$ are connected in parallel via the relays, a magnetic field increases by a predetermined value in proportion to the other magnetic field generated when the first and second main/auxiliary windings $L_{M1}$, $L_{M2}$, $L_{S1}$, and $L_{S2}$ are connected in series via the relays, such that rotation speed of the motor also increases.

The variable speed motor according to the present invention is applicable to a variety of devices requiring gearshift actions, for example, washing machines, and dish washers, etc. In the case of the washing process or the dehydration process, the motor speed must be changed from a high speed to a low speed, or must also be changed from the low speed to the high speed as necessary.

Figure 5:
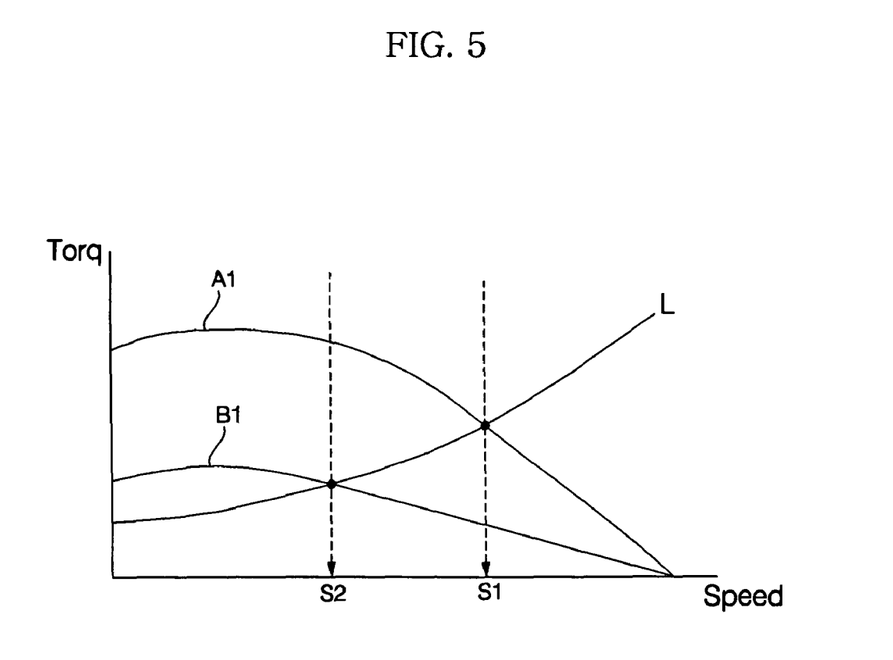
FIG. 5 is a graph illustrating variation in dehydration speed when a switching operation between serial/parallel connections of a main winding and an auxiliary winding is performed in the variable speed motor in accordance with the first preferred embodiment of the present invention.

FIG. 5 is a graph illustrating the relationship between rotation speed and rotation torque of the motor when a switching operation between serial/parallel connections of the variable speed motor is performed. FIG. 5 shows a first case in which the main winding and the auxiliary winding are connected in series, a second case in which the main winding and the auxiliary winding are connected in parallel, and a load curve of the motor applied to a washing machine.

As shown in FIG. 5, if the motor is applied to the washing machine to perform a dehydration process, and a user or operator desires to rotate the motor at high speed to perform a high-speed dehydration process, the main winding and the auxiliary winding of the motor are connected in parallel via the relays, and the motor is rotated at a predetermined speed of S1 at which a rotation torque curve A1 meets a load curve L in the above-mentioned parallel connection state.

Also, if the user or operator desires to rotate the motor at low speed to perform a low-speed dehydration process, the main winding and the auxiliary winding of the motor are connected in series via the relays, the motor is rotated at a predetermined speed of S2 at which the rotation torque curve B1 meets the load curve L in the above-mentioned serial connection state, such that the motor speed can be greatly changed from a high speed to a low speed.

Particularly, the variable speed motor according to the present invention acts as a pole-change motor to which the 4-pole winding and the 12-pole winding are wound separately from each other. Therefore, the variable speed motor acts as a 12-pole motor (a) during a washing process requiring a low-speed/high-torque operation, and acts as a 4-pole motor (b) during a dehydration process requiring either a high-speed/high-torque operation or a low-speed/low-torque operation, such that the main and auxiliary windings wound in the form of 4-pole motor (b) are switched to a serial or parallel connection as necessary, and a variable range of the motor speed can be greatly extended.

Also, if the variable speed motor acts as the 12-pole motor (b), a plurality of poles are formed, such that speed winding are deteriorated, and the speed can be changed by a phase control operation of the power-supply signal received in the motor.

Figure 6:
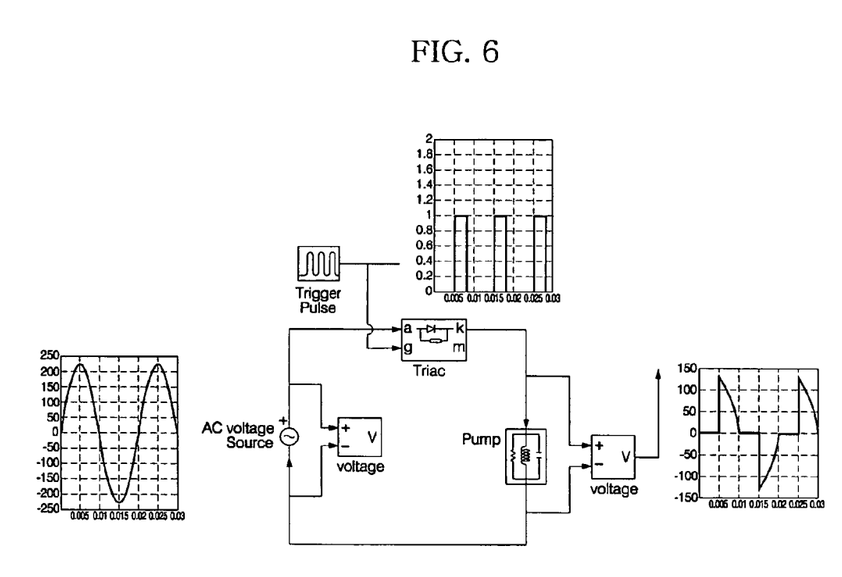
FIG. 6 is a circuit diagram illustrating a phase control circuit when the variable speed motor shown in FIG. 4 performs a 12-pole operation in accordance with the first preferred embodiment of the present invention.

FIG. 6 is a circuit diagram illustrating a phase control circuit when the variable speed motor shown in FIG. 4 performs a 12-pole operation in accordance with the first preferred embodiment of the present invention.

The phase control circuit includes a triac element to vary the motor speed when a sine-wave input voltage is received in the motor, such that it changes the magnitude of a desired output voltage by controlling a firing angle formed by a trigger input pulse of the triac element, resulting in variation in operation speed of the motor.

In other words, the higher the firing angle control, the less the magnitude of voltage applied to the motor. As a result, the motor speed is changed in the range from a high speed to a low speed. The less the degree of firing angle control, the higher the motor speed ranging from low speed to high speed.

Also, the phase control operation and the motor driving are switched on or off at intervals of a predetermined time, such that a variable range of the motor speed can be more extended.

A variable speed motor according to a second preferred embodiment of the present invention is almost identical with the above-mentioned variable speed motor according to the first preferred embodiment of the present invention, with the exception of a tap winding. Therefore, like elements are denoted by the same reference numerals, such that their detailed description will herein be omitted for the convenience of description.

Figure 7A:
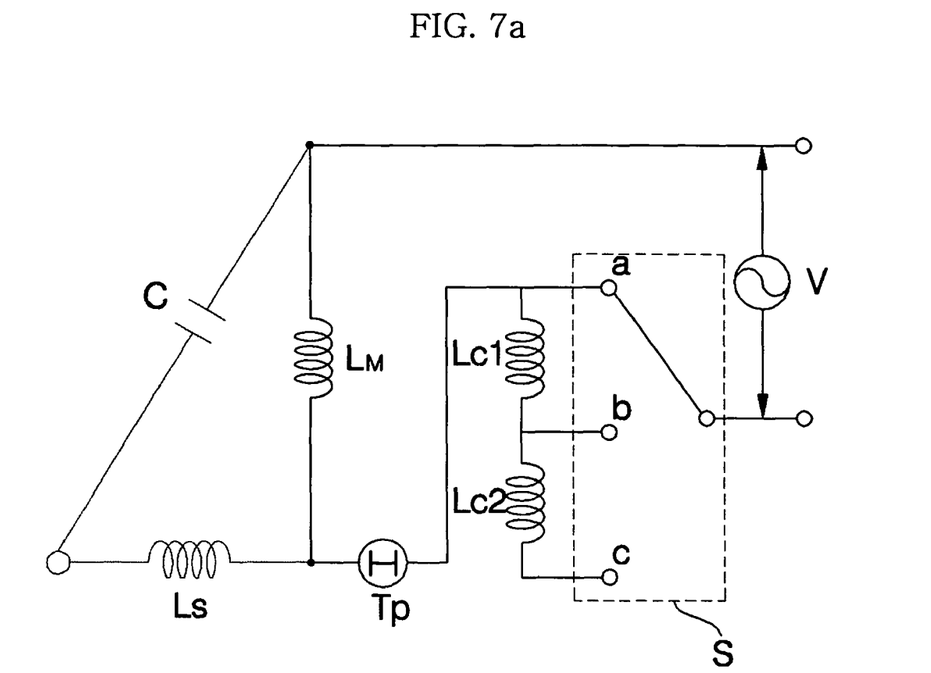
FIGS. 7a, 7b, and 7c are circuit diagrams illustrating a 4-pole main winding motor whose tap winding is switched in a variable speed motor in accordance with a second preferred embodiment of the present invention.
Figure 7B:
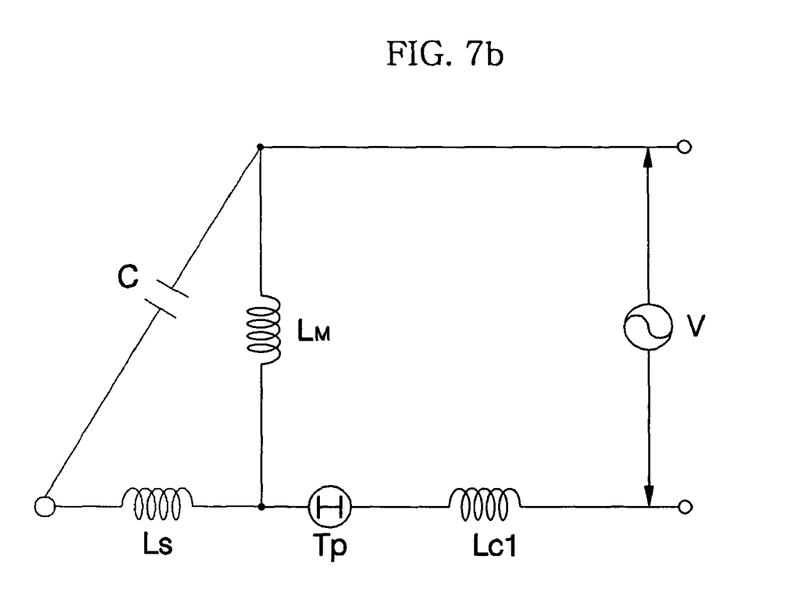
Figure 7C:
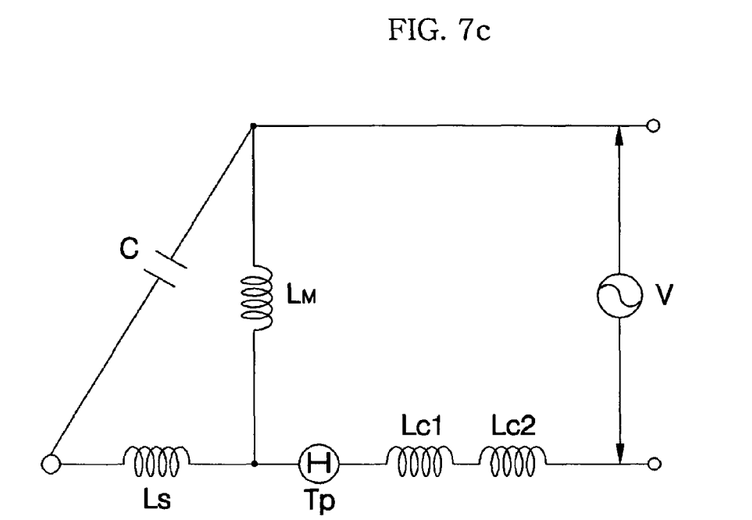

FIGS. 7a, 7b, and 7c are circuit diagrams illustrating a 4-pole main winding motor whose tap winding is switched in a variable speed motor in accordance with a second preferred embodiment of the present invention. FIG. 7a is a circuit diagram illustrating a connection among the main winding, the auxiliary winding, and the tap winding in accordance with the second preferred embodiment of the present invention. FIG. 7b is a circuit diagram illustrating a connection between the tap winding and a second terminal in accordance with the second preferred embodiment of the present invention. FIG. 7c is a circuit diagram illustrating a connection between the tap winding and a third terminal in accordance with the second preferred embodiment of the present invention.

The variable speed motor according to the second preferred embodiment of the present invention includes a main winding $L_M$ capable of generating an alternating magnetic field, an auxiliary winding $L_S$ capable of generating an auxiliary magnetic field, and a capacitor C connected to the auxiliary winding $L_S$ in series. The variable speed motor further includes a thermal protection (TP) element to prevent overload from being generated in an operation mode.

If the variable speed motor is operated as a 4-pole motor, it further includes tap windings $L_{C1}$ and $L_{C2}$ connected in series to the main winding $L_M$ forming 4 poles, resulting in the occurrence of variation in magnetic field of the main winding $L_M$. The tap windings $L_{C1}$ and $L_{C2}$ include a switch S capable of changing a winding length according to individual levels of a speed to be controlled.

Therefore, as shown in FIG. 7a, if a sinusoidal AC voltage signal is applied between two nodes A and B, the switch S includes an input terminal (not shown) connected to the sinusoidal AC voltage signal, and one or more terminals a, b, and c differently arranged according to individual parts of the tap windings $L_{C1}$ and $L_{C2}$, such that the intensity of alternating magnetic field formed in the main winding $L_M$ may also be changed according to the switching operations of the switch S.

For example, a detailed description of the above-mentioned operations will hereinafter be described with reference to the annexed drawings.

If the AC voltage signal is applied to the circuit, and the switch S is connected to one of the terminals of the tap winding, the induction motor satisfies the above-mentioned equation 1. If the AC voltage signal and its frequency are determined to be a predetermined voltage (V) at 60Hz as shown in Equation 1, the magnetic flux is inversely proportional to the number of turns.

In this case, if the first, second, and third terminals "a", "b", and "c" are arranged at the tap winding, and the switch S connects the input terminal to the first terminal "a" as shown in FIG. 7a, the current signal flows in only the main winding $L_M$, and the number of turns of the winding wound on the stator 1 is equal to the number of main windings LM, such that a magnetic flux is generated.

As shown in FIG. 7b, if the switch S connects the input terminal to the second terminal "b", a tap winding $L_{C1}$ having a predetermined length, which is connected to the main winding $L_M$, is formed, such that the number of turns of the winding to which a current signal is substantially applied is equal to the number of turns of the main winding $L_M$ and the number of turns of the tap winding $L_{C1}$.

Therefore, the number of turns of the winding applied to Equation 1 increases, such that a magnetic flux generated in the motor is less than the other magnetic flux generated when the switch S is connected to the first terminal "a", resulting in reduction of rotation speed of the motor.

As shown in FIG. 7c, if the switch S connects the input terminal to the third terminal "c", the length of each tap winding $L_{C1}$ or $L_{C2}$ connected to the main winding is maximized, such that the number of turns of the winding to which a current signal is applied is substantially maximized. As a result, a magnetic flux generated from the motor is minimized, such that rotation speed of the motor is also minimized.

Preferably, the switch S is implemented with a relay.

Figure 8:
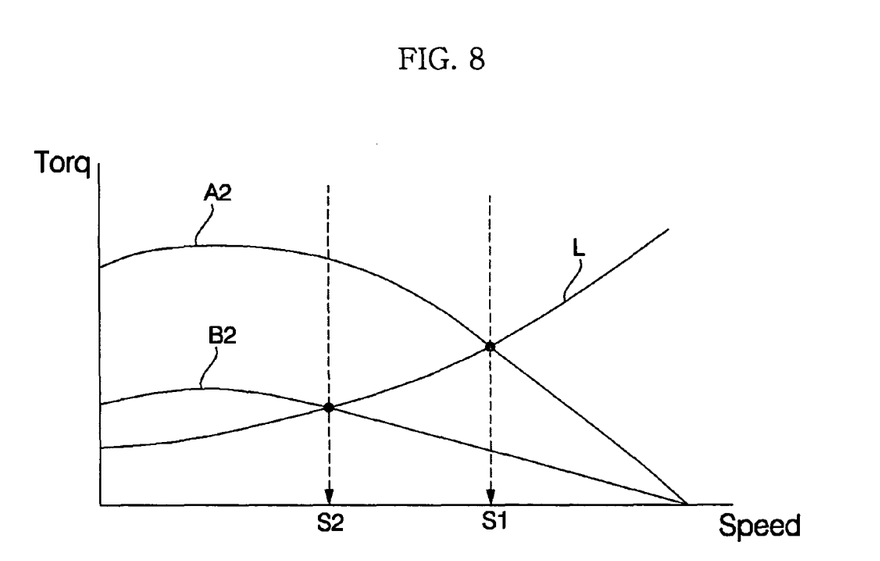
FIG. 8 is a graph illustrating variation in motor speed when a switching operation of the tap winding in the variable speed motor in accordance with the second preferred embodiment of the present invention.

FIG. 8 is a graph illustrating variation in motor speed when a switching operation of the tap winding in the variable speed motor in accordance with the second preferred embodiment of the present invention.

If terminals are arranged at both ends of the tap windings $L_{C1}$ and $L_{C2}$, and the tap windings are connected to the switch S, rotation torque applied to the motor reaches a minimum value or a maximum value according to the number of turns of the tap windings connected to the main winding $L_M$, such that the motor has highest rotation speed or lowest rotation speed.

In the graph shown in FIG. 8, a curve "A2" shows rotation speed and torque of the motor when the switch S is connected to the first terminal, a curve "B2" shows rotation speed and torque of the motor when the switch S is connected to the third terminal. In order to rotate the motor, predetermined torque must be transmitted to load connected to the motor, such that a torque amount required for the load is equal to a predetermined value of a specific point at which the load curve L meets the motor torque graphs A2 and B2.

Particularly, if one or more terminals are additionally arranged at predetermined parts of the tap windings $L_{C1}$ and $L_{C2}$, and one of the terminals is connected to the switch S, an intermediate speed between the maximum/minimum speeds can be changed stepwise according to the connection length between them.

Therefore, if the variable speed motor is operated as a 4-pole motor, the switching of the tap windings $L_{C1}$ and $L_{C2}$ is performed, such that the motor speed can be changed. If the variable speed motor is operated as a 12-pole motor, rotation speed of the motor is controlled by controlling an input voltage phase in the same manner as in the first preferred embodiment of the present invention.

In the meantime, similar to the first preferred embodiment of the present invention, the variable speed motor according to the second preferred embodiment is applicable to a washing machine.

If laundry is included in a drum of the washing machine to which the variable speed motor is mounted, the washing machine rotates the above-mentioned motor at a specific rotation number during a predetermined period of time, so that it rotates the drum. As a result, the washing machine performs a washing process capable of removing contaminants from dirty laundry contained in the drum using operations of water.

The washing process rotates the drum by forward/reverse rotation of the motor, and induces operations of the water, such that it can remove contaminants from soiled or dirty laundry. In the case of the washing process, the motor, which must be operated to have high torque at low speed, is operated as a 12-pole motor to minimize power consumption, and varies its speed using a phase control operation and on/off control operations.

If the washing process is terminated, dirty water contained in a tub is drained to the outside of the washing machine via a drainage device, a rinsing process for rinsing bubbles left in laundry is repeated a predetermined number of times, and a dehydration process for centrifugally dehydrating the laundry, such that an overall washing process is terminated.

In this case, if the washing process is terminated and the dehydration process begins, the variable speed moor is operated as a 4-pole motor, the relay is connected to the first terminal to perform a high-speed dehydration process, such that the motor is rotated at high speed.

In the case of a medium-speed dehydration process, the relay is connected to the second terminal, such that the dehydration process is performed at medium speed. In the case of a low-speed dehydration process, the relay is connected to the third terminal, such that the motor is rotated at low speed.

In the case of a low-speed step, a medium-speed step, and a high-speed step of the motor, an intermediate speed of each step can be changed by a simple phase control operation. Preferably, the number of steps may be equal to or higher than a predetermined number of 3.

Configuration and operations of the variable speed motor according to the third preferred embodiment of the present invention will hereinafter be described. A variable speed motor according to a third preferred embodiment of the present invention is almost identical with the above-mentioned variable speed motor according to the first preferred embodiment of the present invention, with the exception of a plurality of capacitors included in the motor. Therefore, like elements are denoted by the same reference numerals, such that their detailed description will herein be omitted for the convenience of description.

Figure 9A:
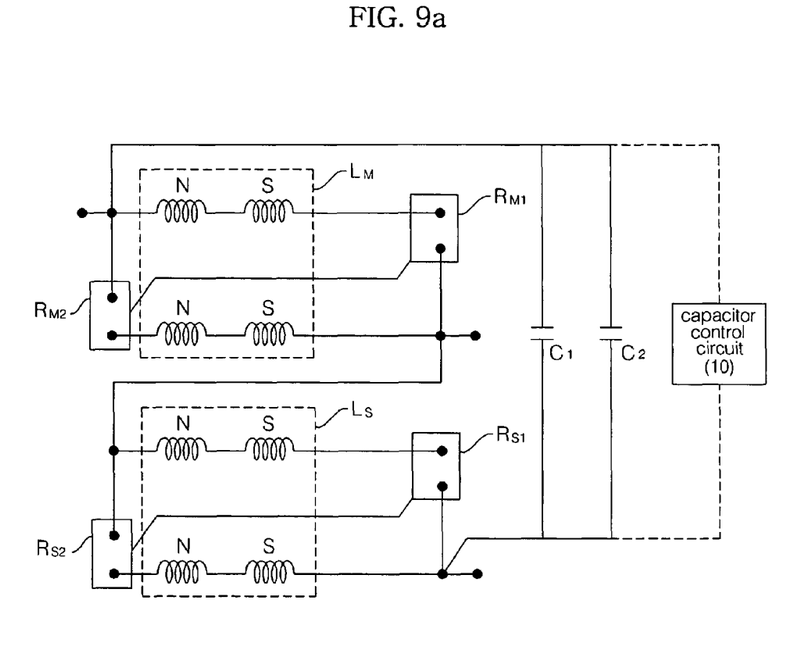
FIGS. 9a, 9b, and 9c are circuit diagrams illustrating variable speed motors in accordance with a third preferred embodiment of the present invention.
Figure 9B:
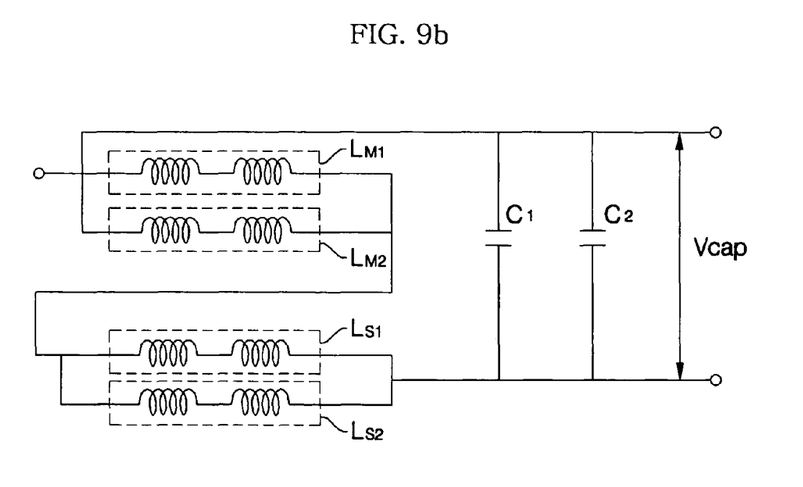
Figure 9C:
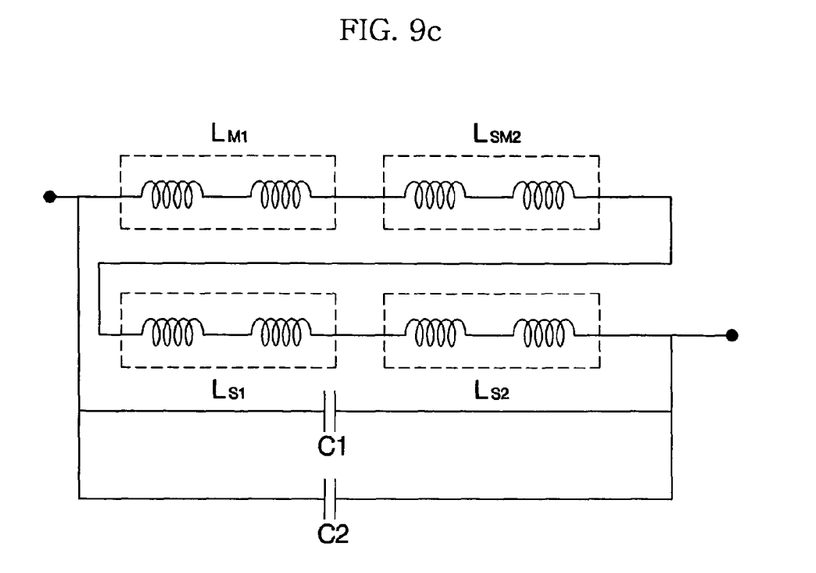

FIGS. 9a, 9b, and 9c are circuit diagrams illustrating variable speed motors in accordance with a third preferred embodiment of the present invention. FIG. 9a is a circuit diagram illustrating the variable speed motor in accordance with the third preferred embodiment of the present invention. FIG. 9b is a circuit diagram illustrating a parallel connection between the main winding and the auxiliary winding in accordance with the second preferred embodiment of the present invention. FIG. 9c is a circuit diagram illustrating a serial connection in accordance with the third preferred embodiment of the present invention.

As shown in FIG. 9b, the variable speed motor according to the present invention includes a main winding $L_M$ and an auxiliary winding $L_S$. A single-phase AC power-supply signal E1 is applied to both ends of the main winding $L_M$ and the auxiliary winding $L_S$.

The main winding $L_M$ and the auxiliary winding $L_S$ are wound on the stator 1, such that a magnetic field having an electrical phase difference of 90° is formed. The magnetic field generated from the main winding $L_M$ and the other magnetic field generated from the auxiliary winding $L_S$ are not compensated by the phase difference of 90°, and the rotor 2 has rotation torque.

The main winding $L_M$ includes the first and second main windings $L_{M1}$ and $L_{M2}$ to form 4 poles, and the auxiliary winding $L_S$ includes the first and second auxiliary windings $L_{S1}$ and $L_{S2}$ to form 4 poles. The first and second main windings $L_{M1}$ and $L_{M2}$ are connected in parallel or in series to the first and second auxiliary windings $L_{S1}$ and $L_{S2}$ via the relays $R_{M1}$, $R_{M2}$, $R_{S1}$, and $R_{S2}$. Rotation speed of the motor is greatly changed by a switching operation between the serial/parallel connections of the above-mentioned windings.

Particularly, the variable speed motor includes a plurality of capacitors C1 and C2 connected in series to the auxiliary winding $L_{M2}$.

The capacitors C1 and C2 are connected in parallel, and are designed to have different capacitances. The variable speed motor may further include a capacitor control circuit 10 connected to the capacitors C1 and C2 connected in parallel in order to control an input voltage applied to the capacitors C1 and C2.

If the input voltage VCAP applied to the capacitors C1 and C2 is adjusted, the capacitor control circuit 10 can adjust the current signal flowing in the capacitors C1 and C2. An amount of a current signal flowing in the main and auxiliary windings $L_M$ and $L_S$ is changed in response to variation in the amount of current signal flowing in the capacitors C1 and C2, such that rotation torque of the motor is controlled.

In other words, if a high voltage $V_{CAP}$ is applied to the capacitors C1 and C2 via the capacitor control circuit 10, an amount of charges of the capacitors C1 and C2 increases, resulting in a higher current signal flowing in the capacitors C1 and C2.

In this case, since the current signal flowing in the capacitors C1 and C2 flows in the main and auxiliary windings $L_M$ and $L_S$, the current signal flowing in the main and auxiliary windings $L_M$ and $L_S$ is also increased in response to the increase in the current signal flowing in the capacitors C1 and C2, such that the intensity of a magnetic field generated in the main and auxiliary windings $L_M$ and $L_S$ is also increased.

The higher the magnetic field generated in the main and auxiliary windings $L_M$ and $L_S$, the higher the rotation torque generated in the rotor of the motor. As a result, speed of the motor may also be increased.

If a low voltage $V_{CAP}$ is applied to the capacitors C1 and C2, an amount of charges accumulated in the capacitors C1 and C2 is reduced, such that a current signal flowing in the capacitors C1 and C2 is also reduced, resulting in reduction of the motor speed, Each capacitor controlled by the capacitor control circuit 10 may vary its capacitance. Although the same voltage generated from the capacitor control circuit 10 is applied to the capacitors C1 and C2, rotation speed of the motor may be changed by varying capacitances of the capacitors C1 and C2. If the capacitances of the capacitors C1 and C2 and the input voltage $V_{CAP}$ are controlled at the same time, the motor speed is divided into various speed steps such that the motor speed is freely changed in various speed steps.

As shown in FIG. 9b, if the first and second main windings $L_{M1}$ and $L_{M2}$ are connected in parallel, and the first and second auxiliary windings $L_{S1}$ and $L_{S2}$ are connected in parallel, the input voltage generated by the single-phase AC power-supply signal E1 is applied to individual main windings and the auxiliary windings $L_{S1}$ and $L_{S2}$. If the AC power-supply signal is a predetermined voltage of 220V, the voltage of 220V is applied to individual windings, magnetic fields corresponding to the voltage of 220V are formed such that the motor is rotated.

As shown in FIG. 9c, if the first and second main windings $L_{M1}$ and $L_{M2}$ are connected in series, and the first and second auxiliary windings $L_{S1}$ and $L_{S2}$ are connected in series, the AC power-supply signal is applied to both the main winding $L_M$ and the auxiliary winding LS. Therefore, if the AC power-supply signal is a predetermined voltage of 220V, the voltage applied to individual windings is 110V, such that rotation speed of the motor in the serial connection is less than that in the parallel connection.

Therefore, the motor can be rotated at high speed when the main windings $L_{M1}$ and $L_{M2}$ are connected in parallel and the auxiliary windings $L_{S1}$ and $L_{S2}$ are connected in parallel via relays $R_{M1}$, $R_{M2}$, $R_{S1}$, and $R_{S2}$, and can be rotated at low speed when the main windings $L_{M1}$ and $L_{M2}$ are connected in series and the auxiliary windings $L_{S1}$ and $L_{S2}$ are connected in series via relays $R_{M1}$, $R_{M2}$, $R_{S1}$, and $R_{S2}$. The capacitor control circuit 10 controls the range of medium speed between the high and low speeds to be divided into a plurality of steps.

Similar to the above-mentioned first and second preferred embodiments, if the variable speed motor according to the third preferred embodiment of the present invention is applied to a washing machine requiring gearshift actions, the variable speed motor according to the third preferred embodiment will be operated as follows.

Figure 10:
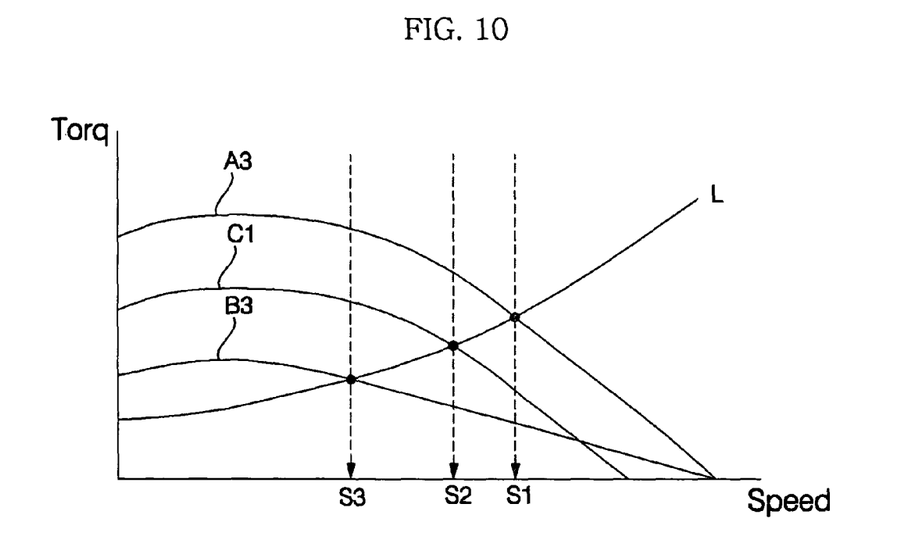
FIG. 10 is a graph illustrating variation in motor speed in the variable speed motor in accordance with the third preferred embodiment of the present invention.

FIG. 10 is a graph illustrating variation in motor speed in the variable speed motor in accordance with the third preferred embodiment of the present invention. In the graph shown in FIG. 10, a curve "A3" shows rotation speed and torque of the motor when the above-mentioned windings are connected in parallel, and a curve "B3" shows rotation speed and torque of the motor when the above-mentioned windings are connected in series.

As shown in FIG. 10, if individual windings are connected in parallel, the motor forms the graph A3 in which rotation speed and torque of the motor are depicted, and is rotated at a predetermined value of S1 at which the graph A3 meets the load curve L.

Also, if individual windings are connected in series, the motor is rotated at a predetermined value of S3 at which the graph B3 meets the load curve L.

In this case, if the motor speed S1 in parallel connection is higher than the motor speed S2 in serial connection. If a voltage signal is applied to the capacitors, the torque curve C1 of the motor is formed between the torque curve A3 in the parallel connection and the other torque curve B3 in the serial connection, such that the motor speed at a specific point at which the motor speed meets the load curve L is equal to a relatively medium speed S2.

In other words, if the magnitude of the voltage signal applied to the capacitors is controlled, rotation speed S2 of the motor can be changed between the high speed S1 and the low speed S3.

The above-mentioned operations are considered to be speed control operations of the motor during the dehydration process of the washing machine in the same manner as in the first and second preferred embodiments of the present invention. During a washing process requiring a low-speed/high-torque state, the motor is operated as a 12-pole motor. If the rotation speed of the motor increases or decreases to allow the washing machine to be operated at predetermined speed, on/off times of the input voltage applied to the motor are adjusted, such that the motor speed can also be adjusted.

A variable speed motor according to a fourth preferred embodiment of the present invention performs a switching operation between serial/parallel connections of the motor via relays, and further includes an additional tap winding, such that it can greatly extend the range of variable speed of the motor.

Figure 11A:
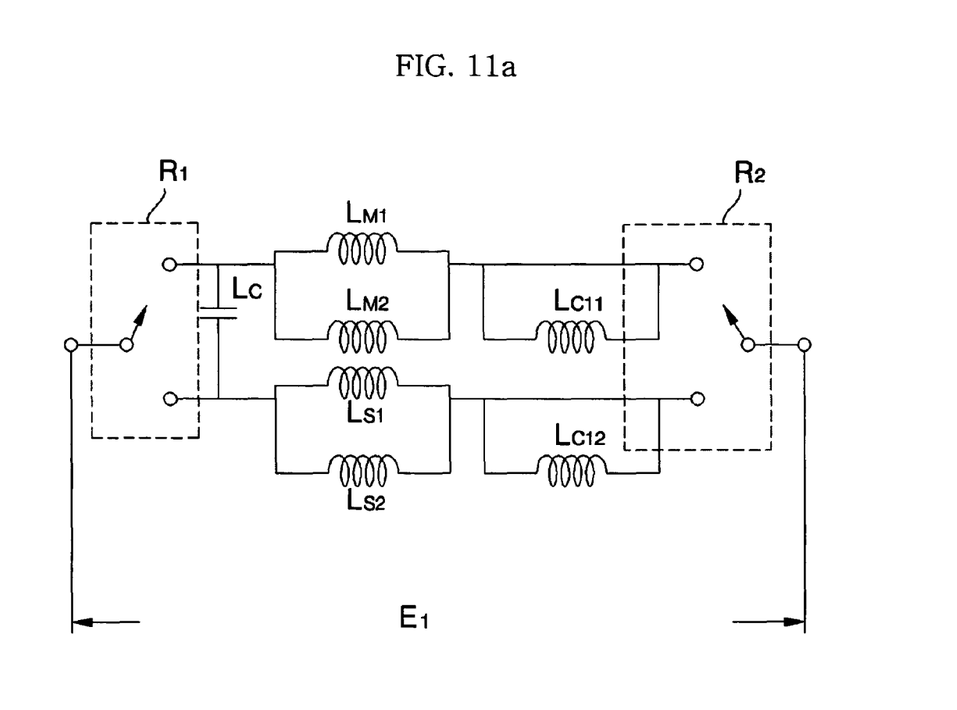
FIGS. 11a, 11b, and 11c are serial/parallel connections of a main winding and an auxiliary winding, and a tap winding for use in a variable speed motor in accordance with a fourth preferred embodiment of the present invention.
Figure 11B:
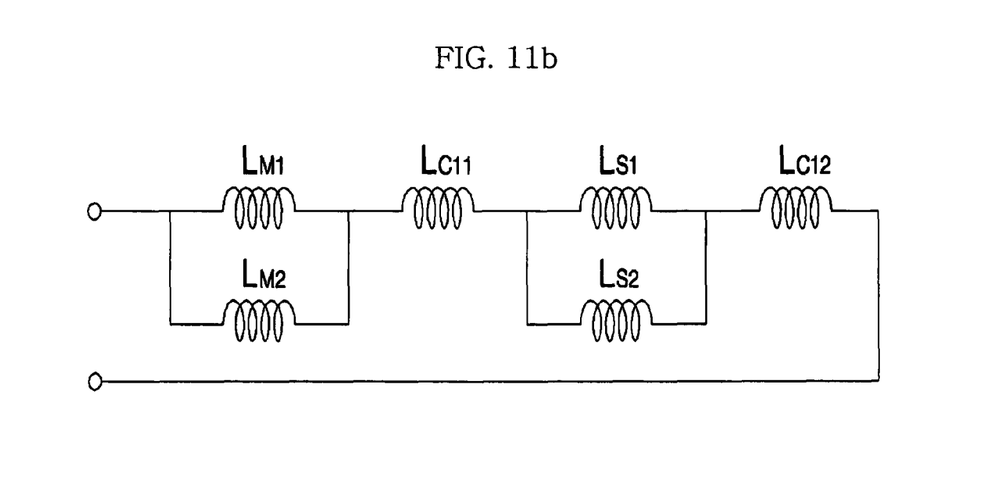
Figure 11C:
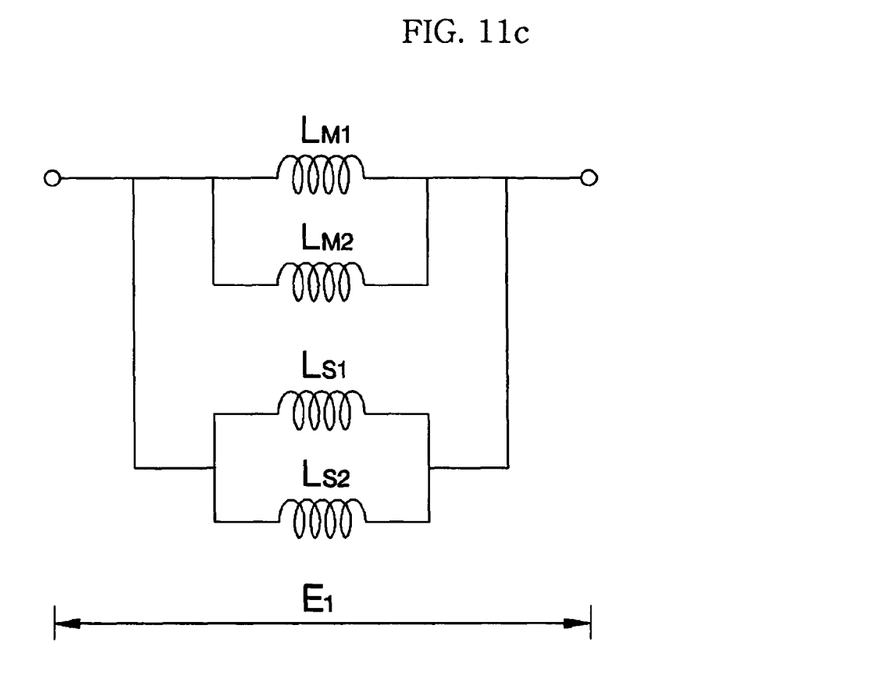

FIGS. 11a, 11b, and 11c are serial/parallel connections of a main winding and an auxiliary winding, and a tap winding for use in a variable speed motor in accordance with a fourth preferred embodiment of the present invention. FIG. 11a is a circuit diagram illustrating the variable speed motor in accordance with the fourth preferred embodiment of the present invention. FIG. 11b is a circuit diagram illustrating the variable speed motor in which the main winding, the auxiliary winding, and the tap winding are connected in series in accordance with the fourth preferred embodiment of the present invention. FIG. 11c is a circuit diagram illustrating a parallel connection between the main winding and the auxiliary winding in accordance with the fourth preferred embodiment of the present invention.

As shown in FIG. 11a, the variable speed motor according to the fourth preferred embodiment of the present invention includes a main winding $L_M$, an auxiliary winding $L_S$, tap windings $L_{C11}$ and $L_{C12}$, and relays R1 and R2. The main winding $L_M$ includes first and second main windings $L_{M1}$ and $L_{M2}$. The auxiliary winding $L_S$ includes first and second auxiliary windings $L_{S1}$ and $L_{S2}$. The tap windings $L_{C11}$ and $L_{C12}$ are connected to the main windings $L_{M1}$ and $L_{M2}$ and the auxiliary windings $L_{S1}$ and $L_{S2}$ via relays R1 and R2, such that they form serial/parallel connections.

The first and second main windings $L_{M1}$ and $L_{M2}$ are connected in parallel to the first and second auxiliary windings $L_{S1}$ and $L_{S2}$, the first relay R1 is connected to the main windings $L_{M1}$ and $L_{M2}$ and the auxiliary windings $L_{S1}$ and $L_{S2}$, and the second relay R2 is connected to the tap windings $L_{C11}$ and $L_{C12}$, such that the first and second main windings $L_{M1}$ and $L_{M2}$ and the first and second auxiliary windings $L_{S1}$ and $L_{S2}$ are connected in series or in parallel via the relays R1 and R2.

The main windings $L_{M1}$ and $L_{M2}$ and the auxiliary windings $L_{S1}$ and $L_{S2}$ are connected in series or in parallel via the first relay R1. The tap winding $L_{C11}$ is connected to or disconnected from the main windings $L_{M1}$ and $L_{M2}$ via the second relay R2. In this manner, the tap winding $L_{C12}$ is connected or unconnected to the auxiliary windings $L_{S1}$ and $L_{S2}$ via the second relay R2.

The main windings $L_{M1}$ and $L_{M2}$ connected in parallel are connected to the first terminal arranged at one end of the main windings $L_{M1}$ and $L_{M2}$ via the second relay R2, and are also connected to the second terminal arranged at one end of the tap winding $L_{C11}$ connected to the main windings $L_{M1}$ and $L_{M2}$ connected in parallel via the second relay R2. In this manner, the auxiliary windings $L_{S1}$ and $L_{S2}$ are connected to the third terminal arranged at one end of the first and second auxiliary windings connected in parallel via the second relay R2, or are also connected to the fourth terminal arranged at one end of the tap winding $L_{C12}$ connected to the auxiliary windings $L_{S1}$ and $L_{S2}$ connected via the second relay R2. As a result, the range of variable speed of the motor can be extended.

In more detail, if the AC voltage signal is applied to the above-mentioned circuit, the motor satisfies equation 1. If the magnitude and frequency of the AC voltage signal are constantly maintained, a magnetic flux is inversely proportional to the number of turns in the motor.

The power-supply signal applied to the above-mentioned circuit is divided to individual poles formed by the main windings $L_{M1}$ and $L_{M2}$, the auxiliary windings $L_{S1}$ and $L_{S2}$, and/or the tap windings $L_{C11}$ and $L_{C12}$. If the voltage of the power-supply signal applied to the motor is 220V and coils are connected in parallel in the motor, the voltage of 220V is loaded on the main windings $L_{M1}$ and $L_{M2}$ and the auxiliary windings $L_{S1}$ and $L_{S2}$. If the coils are connected in series, the voltage of 220V is divided into individual poles, such that a voltage loaded on a pair of poles is 110V.

Therefore, an amount of magnetic flux generated when the main windings $L_{M1}$ and $L_{M2}$ are connected in parallel to the auxiliary windings $L_{S1}$ and $L_{S2}$ is higher than that generated when the main windings $L_{M1}$ and $L_{M2}$ are connected in series to the auxiliary windings $L_{S1}$ and $L_{S2}$. If additional tap windings $L_{C11}$ and $L_{C12}$ are connected to the main windings $L_{M1}$ and $L_{M2}$ or the auxiliary windings $L_{S1}$ and $L_{S2}$ via the second relay R2, a current signal flows in the main windings $L_{M1}$ and $L_{M2}$ connected in parallel and the tap windings $L_{C11}$ and $L_{C12}$ connected in series to the above-mentioned main windings $L_{M1}$ and $L_{M2}$.

In this case, the number of turns of overall windings wound on the stator is equal to the sum of the number of turns of the main windings and the number of turns of the tap windings, such that an overall turn number is increased and the amount of magnetic flux is reduced, resulting in reduction of the motor speed.

Figure 12:
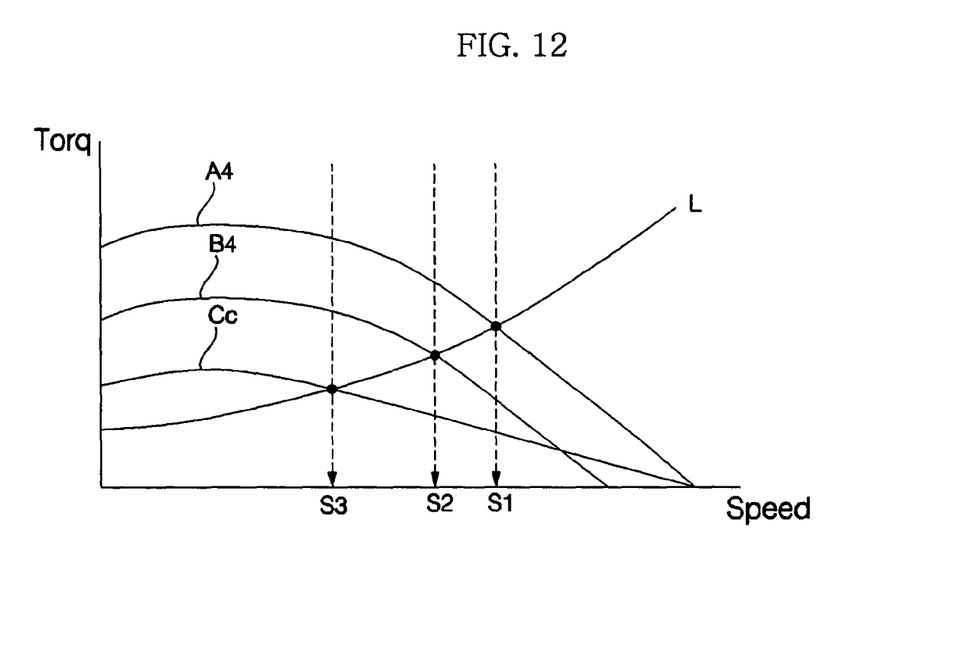
FIG. 12 is a graph illustrating variation in dehydration speed when the tap windings are switched in the variable speed motor in accordance with the fourth preferred embodiment of the present invention.

FIG. 12 is a graph illustrating variation in dehydration speed when the tap windings are switched in the variable speed motor in accordance with the fourth preferred embodiment of the present invention. In the graph of FIG. 12, a curve "A4" is indicative of a torque curve formed when the above-mentioned windings are connected in parallel, a curve "B4" is indicative of a torque curve formed when the above-mentioned windings are connected in series, and a curve "Cc" is indicative of a torque curve formed when the tap windings are connected to the above-mentioned windings.

In other words, provided that the motor must be rotated at high speed during the dehydration process, and the above-mentioned windings are connected in parallel via the relays, the motor is rotated at high speed at a specific point at which predetermined torque is applied to the load. In the case of a low-speed dehydration process, the above-mentioned windings are connected in series via the relays to rotate the motor at low speed, such that predetermined torque is applied to the load.

Also, if additional tap windings are sequentially connected on the condition that the above-mentioned windings are connected in series or in parallel, the motor is rotated at medium speed to perform a medium-speed dehydration process, such that the dehydration process can be performed in multiple stages.

As apparent from the above description, the variable speed motor according to the present invention performs a switching operation between serial/parallel connections of main and auxiliary windings capable of forming poles, greatly extends the range of a variable speed of the motor, and does not require an additional drive unit for varying the motor speed, such that production costs are greatly reduced, and electromagnetic vibration noise caused by a low-speed control mode of the motor is also greatly reduced.

Particularly, if the motor is applied to a washing machine, it is operated as a 12-pole motor during a washing process, and is operated as a 4-pole motor during a dehydration process, such that the variable speed motor controls rotation speed of the motor using a phase control operation and a winding switching operation. Therefore, the variable speed motor effectively performs a speed control operation, and greatly reduces power consumption.

Also, the variable speed motor further includes tap windings connected in series to the main windings to extend the range of a variable speed of the motor. Therefore, the variable speed motor can greatly extend the range of a variable speed of the motor without using an additional drive unit capable of varying the motor speed, and controls a medium or intermediate speed using a phase control operation, such that electromagnetic vibration noise caused by a low-speed dehydration process is greatly reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A variable speed motor comprising:
   a main winding including first and second main windings, and an auxiliary winding including first and second auxiliary windings, wherein the main winding and the auxiliary winding are wound on a stator to form a plurality of poles; and
   a main relay connecting the first and second main windings selectively in series or parallel; and
   an auxiliary relay connecting the first and second auxiliary windings selectively in series or parallel and a phase control circuit for controlling a phase of an input voltage during a 12-pole operation, transmitting the phase-controlled result to the motor, and switching on or off the motor to control rotation speed of the motor.

2. The variable speed motor according to claim 1, wherein the relays provide a parallel connection between the first and second main windings and a parallel connection between the first and second auxiliary windings when the motor is rotated at high speed, and provide a series connection between the first and second main windings when the motor is rotated at low speed.

3. The variable speed motor according to claim 1, wherein the main winding and the auxiliary winding form 4 poles, and a 12-pole winding is additionally wound on the stator, such that a pole-change operation is available.

4. A variable speed motor comprising:
   a stator on which a 4-pole winding and a 12-pole winding are wound;
   a plurality of tap windings connected in series for extending a variable range of rotation speed of the motor during a 4-pole operation mode;
   a relay configured to perform a switching operation to select the number of tap winding to be connected in series to the 4-pole winding according to levels of a speed to be controlled; and
   a phase control circuit for controlling a phase of an input voltage during a 12-pole operation, transmitting the phase-controlled result to the motor, and switching on or off the motor to control rotation speed of the motor.

5. A variable speed motor comprising:
a main winding including first and second main windings, and an auxiliary winding including first and second auxiliary windings, wherein the main winding and the auxiliary winding are wound on a stator to form a plurality of poles;
a plurality of relays for performing a switching operation between series/parallel connections of the first and second main windings or the first and second auxiliary windings; and
a plurality of capacitors connected in series to the second auxiliary winding, for varying rotation speed of the motor in multiple stages; and
a capacitor control circuit which is connected to the capacitors and controls individual capacitances of the capacitors to vary the speed of the motor.

6. The variable speed motor according to claim 5, wherein the capacitors have different capacitances, and are connected in parallel.

7. The variable speed motor according to claim 5, wherein the capacitor control circuit controls a voltage signal applied to both ends of the capacitors to vary a current signal flowing in the capacitors, such that it varies rotation torque of the motor.

8. The variable speed motor according to claim 7, wherein the relays provide a parallel connection between the first and second main windings and a parallel connection between the first and second auxiliary windings when the motor is rotated at high speed, and provide a series connection between the first and second main windings when the motor is rotated at low speed.

9. The variable speed motor according to one claim 5, further comprising:
a phase control circuit for controlling a phase of an input voltage during a 12-pole operation, transmitting the phase-controlled result to the motor, and switching on or off the motor to control rotation speed of the motor.

10. A variable speed motor comprising:
a main winding and an auxiliary winding which are mounted to a stator to form a plurality of poles;
a plurality of tap windings which are connected to the main winding and the auxiliary winding via relays to form series/parallel connections, and extend a range of a variable speed; and
a phase control circuit for controlling a phase of an input voltage during a 12-pole operation, transmitting the phase-controlled result to the motor, and switching on or off the motor to control rotation speed of the motor;
wherein the main winding includes first and second main windings connected in parallel, the auxiliary winding includes first and second auxiliary windings connected in parallel, and the tap windings are connected in series to the main winding and the auxiliary winding via the relays.

11. The variable speed motor according to claim 10, wherein the motor is indicative of a pole-change motor including a 4-pole winding connected to the tap windings, and a 12-pole winding separately from the 4-pole winding.

* * * * *